Oct. 7, 1958 E. J. HIRVONEN 2,854,869
AUTOMATIC ACCURATE DEPTH CONTROL FOR MACHINE TOOLS
Filed March 31, 1954 6 Sheets-Sheet 1
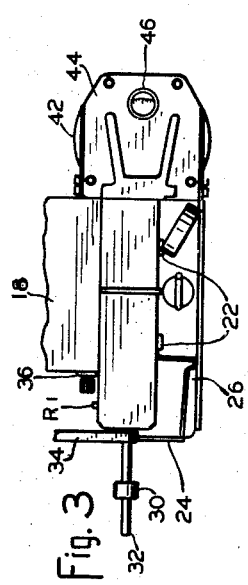
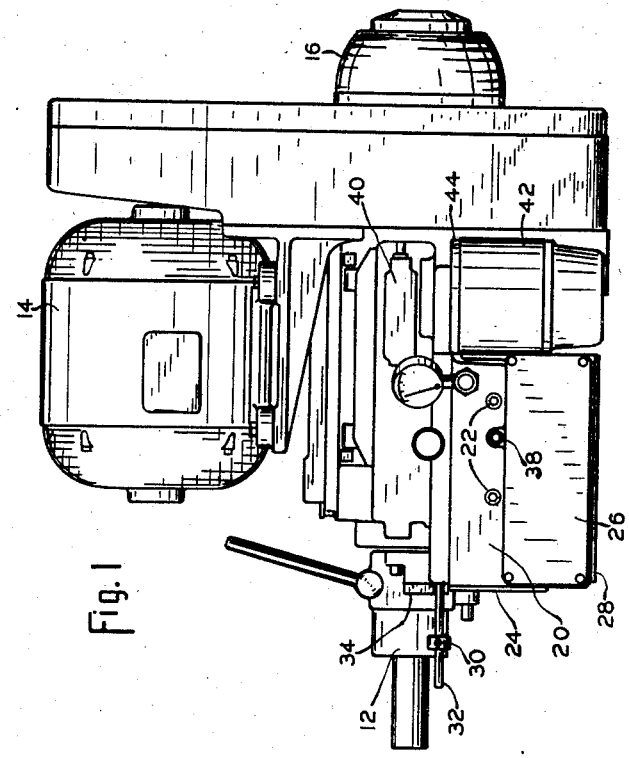
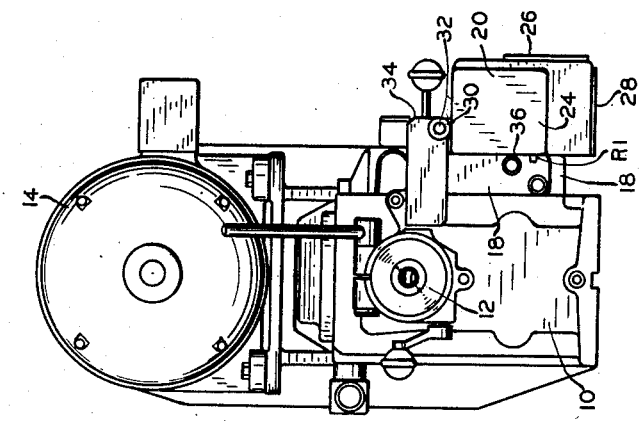
INVENTOR.
ERIC J. HIRVONEN.
BY Charles R. Fay
ATTY.

Oct. 7, 1958  E. J. HIRVONEN  2,854,869
AUTOMATIC ACCURATE DEPTH CONTROL FOR MACHINE TOOLS
Filed March 31, 1954  6 Sheets-Sheet 2

INVENTOR.
ERIC J. HIRVONEN.
BY Charles R. Fay
ATTY.

INVENTOR.
ERIC J. HIRVONEN.
BY Charles R. Fay
ATTY.

Oct. 7, 1958        E. J. HIRVONEN        2,854,869
AUTOMATIC ACCURATE DEPTH CONTROL FOR MACHINE TOOLS
Filed March 31, 1954        6 Sheets-Sheet 4
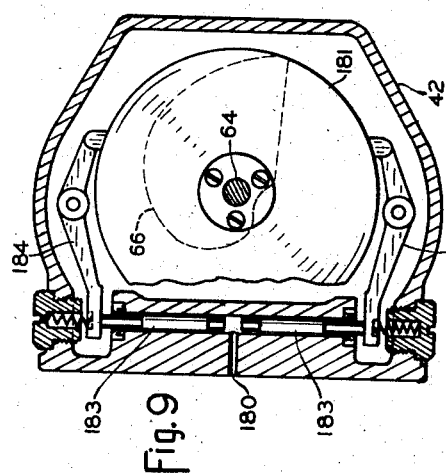
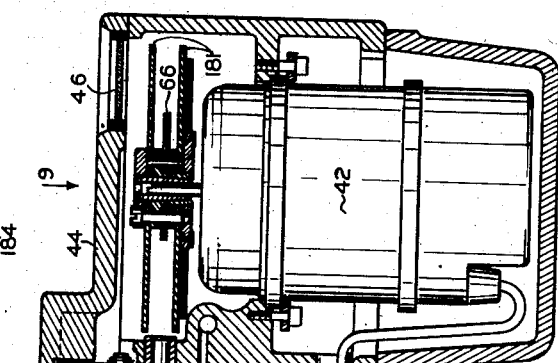
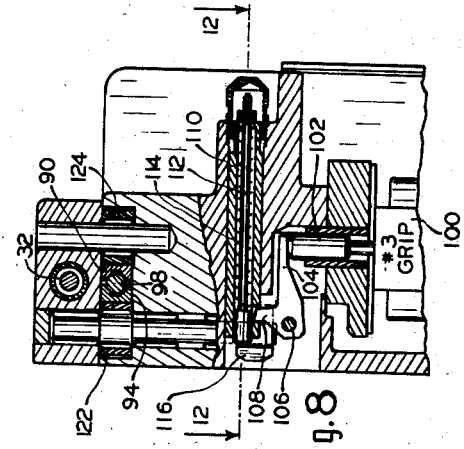
INVENTOR.
ERIC J. HIRVONEN.
BY *Charles R. Fay*
ATT'Y.

Oct. 7, 1958 E. J. HIRVONEN 2,854,869
AUTOMATIC ACCURATE DEPTH CONTROL FOR MACHINE TOOLS
Filed March 31, 1954 6 Sheets-Sheet 5

INVENTOR.
ERIC J. HIRVONEN.
BY Charles R. Fay

ATTY.

Oct. 7, 1958 E. J. HIRVONEN 2,854,869
AUTOMATIC ACCURATE DEPTH CONTROL FOR MACHINE TOOLS
Filed March 31, 1954 6 Sheets—Sheet 6

INVENTOR.
ERIC J. HIRVONEN.
BY Charles R. Fay,
ATTY.

United States Patent Office 2,854,869
Patented Oct. 7, 1958

2,854,869

AUTOMATIC ACCURATE DEPTH CONTROL FOR MACHINE TOOLS

Eric J. Hirvonen, Shrewsbury, Mass., assignor to Leland-Gifford Company, Worcester, Mass., a corporation of Massachusetts Application March 31, 1954, Serial No. 420,054

24 Claims. (Cl. 77—32.1)

This invention relates to a new and improved highly accurate automatic control for the depth of cut for machine tools and particularly for controlling the depth of the hole in drilling. The principal object of the invention resides in the provision of an extremely accurate depth control for use where the amount of material removed or the depth of the hole cut or drilled must be held within very accurate limits and as an example balance drilling of crankshafts may be one illustration of application for the present invention. Crankshafts are ordinarily dynamically balanced by drilling holes at predetermined locations for removing exact amounts of material, when necessary in order to achieve the balance, and the present invention is used to control automatically the depth of the hole drilled in order to remove the exact amount of material required at the specific points desired.

Further objects of the invention include the provision of a device of the class described providing for rapid advance of the tool to the work, novel mechanism for changing slow feed, and for reversal; including the provision of extremely accurate control means for the reversal of the tool to stop the feed and withdraw the tool according to the exact depth of hole required and predetermined; and including new and improved means providing for a delay of actual reversal of one or two seconds after cessation of feed in order to completely cut and clear chips from the hole so as not to leave any unwanted material in the hole.

Further objects of the invention include the provision of chip-breaking by automatic means interrupting the work feed as by a timer mechanism which times the duration of feed and therefore controls the length of the chip, the interruption to the feed being only just long enough to break the chip with special means provided for preventing reversal of the tool, so that there is no step-by-step drilling but dwells in the feed are provided in order to break the chips.

Other objects of the invention include the provision of means for automatically illuminating a light to indicate a dull drill and including re-set means for this device when the drill has been changed; and novel hydraulic means for accomplishing a large part of the machine operations referred to, in combination with new and improved stops, and electric switches, timers, solenoids, etc. all arranged in combination to carry out the objects of the invention.

Other objects and advantages of the invention will appear hereinafter.

Reference is to be had to the accompanying drawings, in which

Fig. 1 is a view in side elevation of a control unit applied to a horizontal drill;

Fig. 2 is a view in front elevation of the device of Fig. 1;

Fig. 3 is a plan view of the control device, the drill itself being omitted;

Fig. 6 is a vertical sectional view through the control apparatus;

Figs. 7 and 8 are sectional views on the corresponding lines in Fig. 6;

Fig. 9 is a plan view, looking in the direction of arrow 9 in Fig. 6, parts being broken away and in section and showing the break for the cam;

Figure 4:
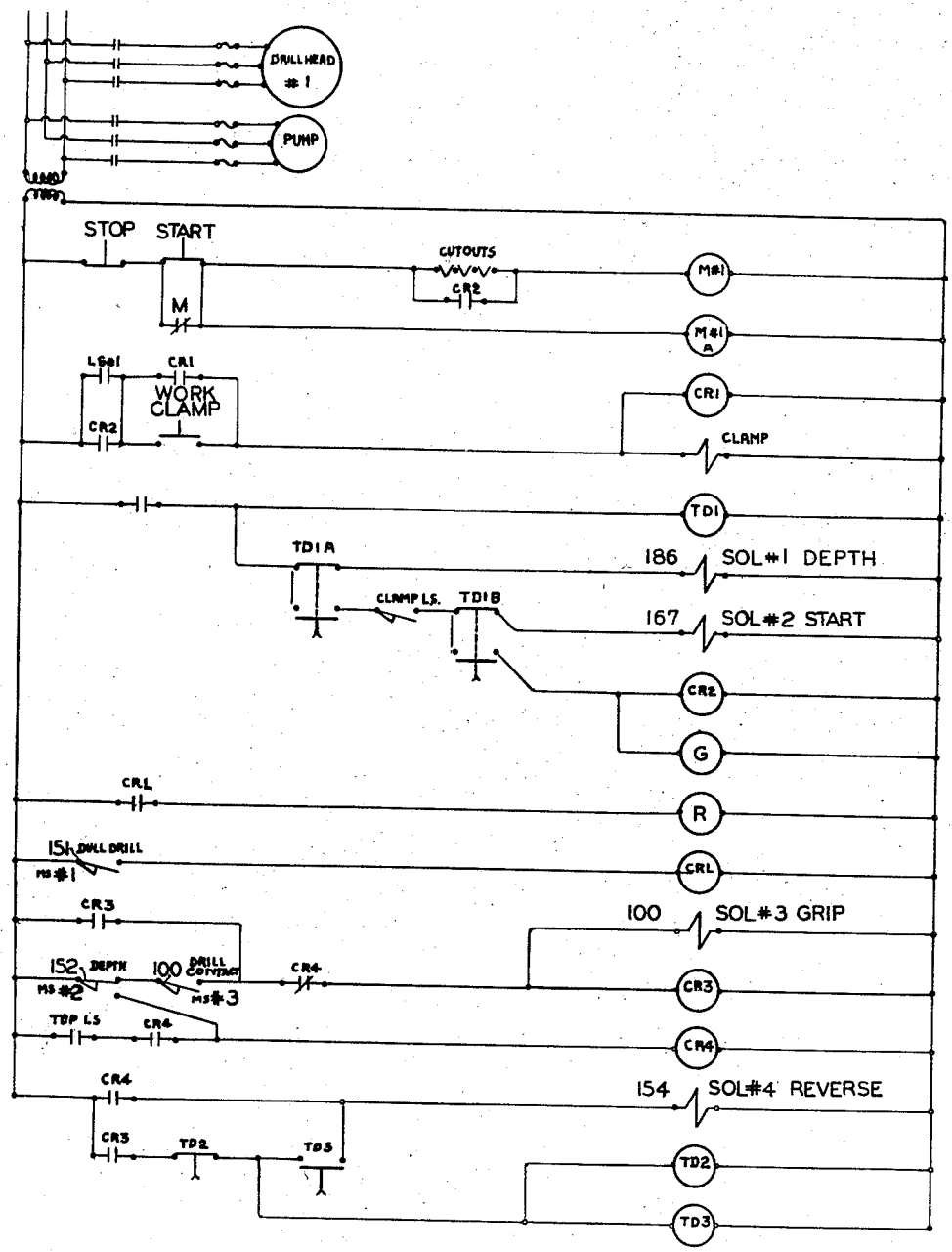
Fig. 4 is a circuit diagram.

In disclosing the present invention, Figs. 1, 2 and 3 are first referred to, these figures illustrating a set-up for use of the present control devices, but it is to be understood that the control mechanism which is the subject matter of this invention may be utilized in other relations and in other machines. In the first place, there is indicated at 10 a housing for the reception of hydraulic operating means for feeding a drill or the like by means of a head 12 and there are provided motors 14 and 16 for rotating the drill and providing power for the hydraulic pumps. This hydraulically operated drill may use some of the constructions shown in my copending application Serial No. 192,864, filed October 30, 1950, issued as Patent No. 2,748,629, dated June 5, 1956, which refers to step feed means for the drill.

In the present case, there is not necessarily any step feed, but nevertheless many of the parts shown in the application identified may be used herein to feed the drill in rapid advance, slow feed and reverse.

Reference numeral 18 indicates a valve block which is associated with a hydraulic mechanism for feeding the drill and the control device which is the subject matter of the present invention is contained within or mounted on a housing 20 which may be secured to the valve block 18 by means of a pair of screws 22 so that the entire attachment may be quickly and easily taken off and replaced.

Reference numeral 24 indicates a cover for a compartment for micro-switches, the reference numeral 26 indicates a cover for all of the wiring connections of the attachment, and the reference numeral 28 refers to a cover for four solenoids which operate the device, all as will be hereinafter described.

An operating collar 30 is mounted on an axially movable rod 32 and this collar may be set to adjust the depth drill mechanism to be described. An arm 34 moving with head 12 contacts the collar 30 at the end of the rapid approach of the tool to move rod 32 thereafter. The numeral 36 indicates a hydraulic feed adjusting dial, 38 is a cap which covers a depth control grip adjustment means, and limit switches may be mounted in a box at 40.

The reference numeral 42 indicates in general the motor part of a Selsyn unit, the generator of which is not shown but is of course operated to control the Selsyn motor 42. A housing is provided for the Selsyn and for a rotary cam which is driven by the Selsyn, said cam being located within the housing adjacent a point 44, and the cover of the housing is provided with a window 46 for a calibrated cam disc as shown in Fig. 3, so that the operator may observe the cam setting at any time.

Figure 5:
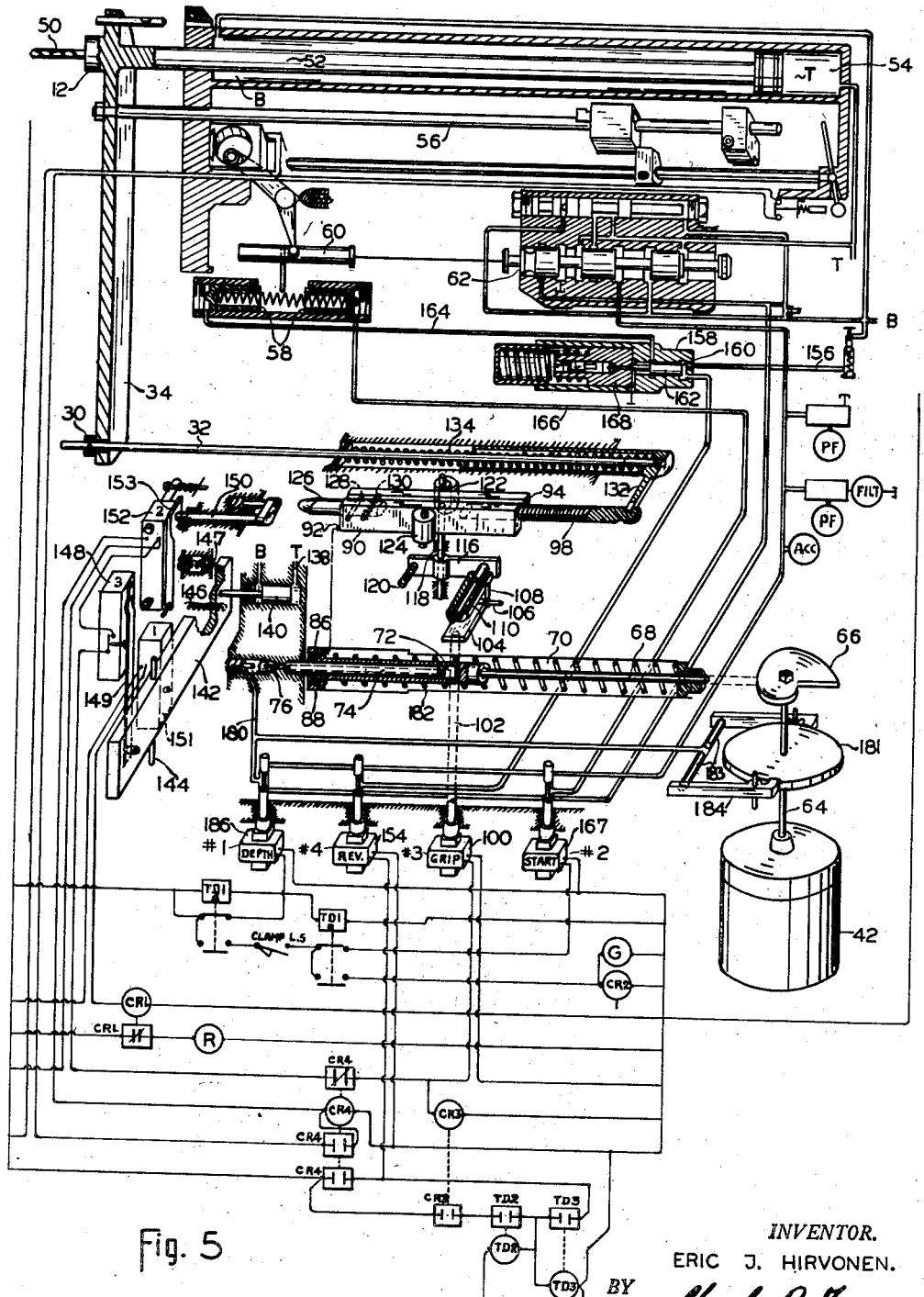
Fig. 5 is a diagrammatic view illustrating the main mechanical hydraulic and electrical parts of the control construction.

Referring now to Fig. 5, there is shown a drill or other tool 50 in the head 12 to be operated by a piston 52 in a main cylinder 54 for advancing, working, and reversal, and the cylinder 54 is supplied by hydraulic fluid by means of a pump (see Fig. 5) operated by one of the electric motors shown in Fig. 1. The rod 56 is a control rod which advances with the head 12 and provides for limit switch operation, etc., all as described in the copending application above referred to. It is believed that the details of this mechanism need not be gone into but in the present case, reversal after the tool feed stroke, is obtained by reversal of plungers 58 which operate a valve control member 60 in order to shift the main valve 62 as called for by the cycle. The plungers 58, the member 60 and the main valve 62 are all shown and described in my copending application, but these members are inserted in the hydraulic circuits so as to illustrate the principles of the present invention and to complete the operation. In any event, sufficient construction is here shown for operating the drill 50 in a predetermined cycle for carrying out the objects of the present invention.

The Selsyn motor 42 has a shaft 64 upon which is mounted the cam 66 referred to above, and this cam is of course turned with the shaft according to the action of the Selsyn generator. Therefore the cam 66 is turned according to a master control comprising the Selsyn generator which may be under the control of an operator or some automatic equipment determining the rotation thereof and not forming a part of this invention. Of course the shaft 64 does not rotate the full 360° and the Selsyn provides an extremely accurate means for setting the cam 66 angularly with respect to a radial line as for instance in the direction of a rod which is indicated at 68. This rod being a feeler blade or the like, is moved to the right in Fig. 5 to impinge upon the cam edge as shown in broken lines so as to provide blade 68 with a different setting for each different degree of angular movement of the cam 66. The rod or blade 68 is usually referred to as the depth control blade.

Figures 13, 13A:
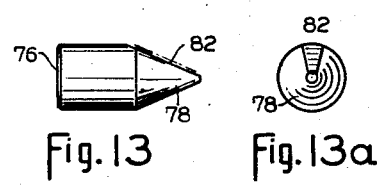
Fig. 13 is a view in side elevation of a fast and slow plunger for the hydraulic fluid.
Fig. 13A is a view in front elevation thereof.
Figure 12:
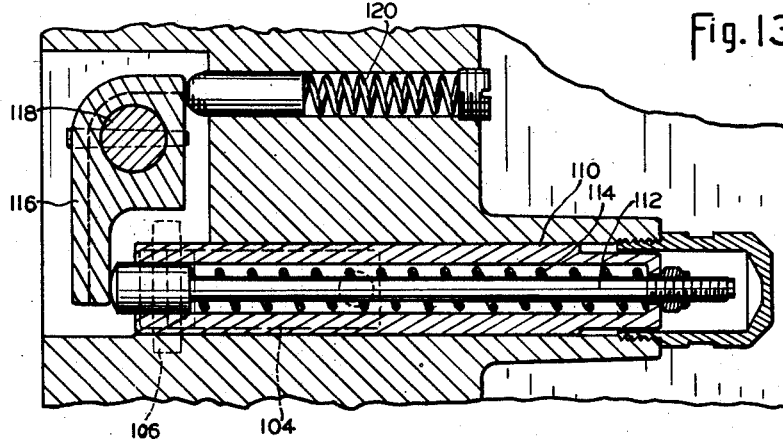
Fig. 12 is an enlarged section on line 12—12 of Fig. 8.

The blade 68 is moved to the right automatically under influence of hydraulic pressure an to this end it is mounted in a cylinder 70 and has a forward hollow end at 72 receiving hydraulic fluid through a pipe 74 from a taper plunger 76. This plunger appears as in Figs. 13 and 13A, having a taper end 78 fitting a seat at 80 (see Fig. 11) with a milled off flat portion 82 on the tapered part. This construction allows the oil in a chamber or port at 84 to leak relatively slowly to the right but to be able to pass back in the oposite direction rapidly under influence of leftward motion of blade 68. The effect of the oil passing through pipe 74 is to urge the blade 68 to the right gently to contact the cam 66, and the blade 68 is provided with a gasket at 86 as shown in Fig. 11.

Figure 11:
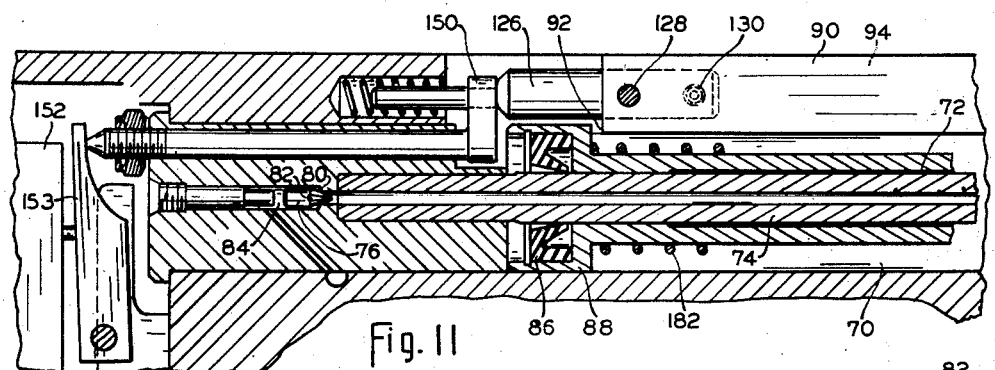
Fig. 11 is an enlarged section showing the pivot controlled blade and associated parts.
Figure 18:
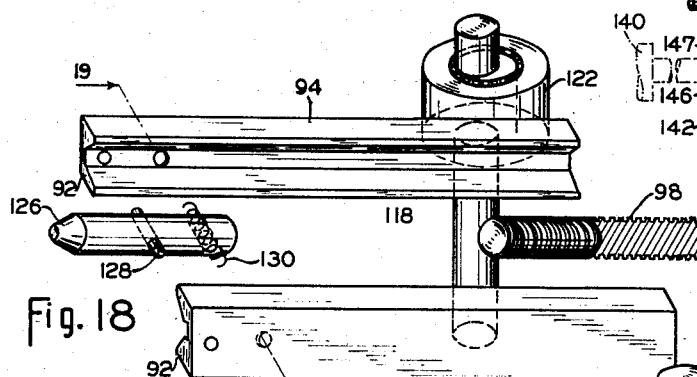
Fig. 18 is a perspective view of the clamp for the control rod.
Figure 19:
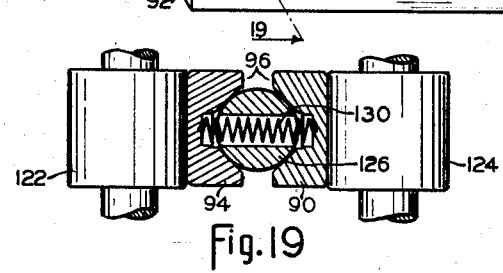
Fig. 19 is a section on line 19—19 in Fig. 18.

The gasket 86 is located in an enlargement 88 which forms a shoulder to impinge upon depth control clamp blocks 90 and 94 at forward shoulder portions thereof at 92 (see Figs. 11 and 18). These depth control blocks are V blocks as best shown at 96 in Fig. 19 and are laterally movable to and from each other to clamp or release a rod 98, which may be roughened or grooved to increase the frictional contact thereof. Obviously when the blocks 90, 94 clamp the rod 98, the latter will move with the blocks 90, 94.

In order to clamp the blocks, there is provided a solenoid which is referred to as the grip solenoid, and it is indicated at 100. There are additional solenoids, all just alike as to physical construction, and they are labeled in Fig. 5 according to their operations as No. 1, No. 4, No. 3 and No. 2. No. 1 is the depth control solenoid, No. 4 is the reverse solenoid, No. 3 is the grip solenoid, and No. 2 is the start solenoid. The No. 3 solenoid has a movable member 102 which rises upon energization and contacts and moves a lever 104 mounted on a pivot-pin 106. The lever 104 is somewhat in the nature of a bell-crank having a short arm 108, see particularly Fig. 8. This short arm enters a notch in a hollow plunger 110 and of course when the member 102 rises, the hollow plunger 110 tends to move to the left in Fig. 8 or away from the observer in Fig. 5, and it carries with it an interior rod 112 which is connected by means of a spring 114 to the hollow plunger 110. The construction is such that the rod 112 moves with the plunger 110 and strikes a lever 116 tending to move the latter about its axis. The lever 116 is spring-loaded as shown at 120, so as to return it in the opposite direction. If the rod 112 encounters undue resistance, the spring 114 causes the plunger to slip on the rod so as to avoid any excess pressure on lever 116.

The axis of the lever 116 is in the pivot-pin 118 which carries on it in fixed relation thereto an eccentric roller 122. This roller is oscillated when member 102 rises and due to the eccentricity, roller 122 will be moved to clamping position to cause the blocks 90 and 94 to move toward each other in order to clamp the rod 98. A fixed roller 124 forms an abutment for the clamping blocks. Thus when solenoid No. 3, which is indicated by the reference numeral 100, is energized, rod 98, control blade 68, and the blocks 90 and 94, will be positioned in accordance with the setting of cam 66.

Blocks 90 and 94 carry with them a depth-adjusting plunger indicated by the reference numeral 126 and this plunger is secured to the blocks by means of a pin 128 and there is a spring 130 which tends to maintain the V blocks 90 and 94 apart against the action of the eccentric roller 122.

It will be seen that the depth control plunger 126 therefore moves with the blocks 90 and 94 and the rod 98 is connected by means of a member 132 to the rod 32 for movement together. Rod 32 carries on it the adjustable operating collar 30, and is spring-loaded by a spring 134. By means of operating collar 30, the entire assembly of rod 32, rod 98, the V blocks 90 and 94 and the depth-adjusting plunger 126 are all carried forwardly with the drill head 12 by means of the arm 34.

The operation of the device is such that the drill head or plunger travels in rapid advance from its retracted, stopped point, and when arm 34 contacts operating collar 30, then the rod 32 and hence the depth-adjusting assembly starts to move to the left in Fig. 5 and this is the initiation of the slow feed, accurately controlled portion of the drill cycle. Of course until the arm 34 strikes the collar 30, the rods 98, 68 and plunger 126 all remain stationary.

Figure 14:
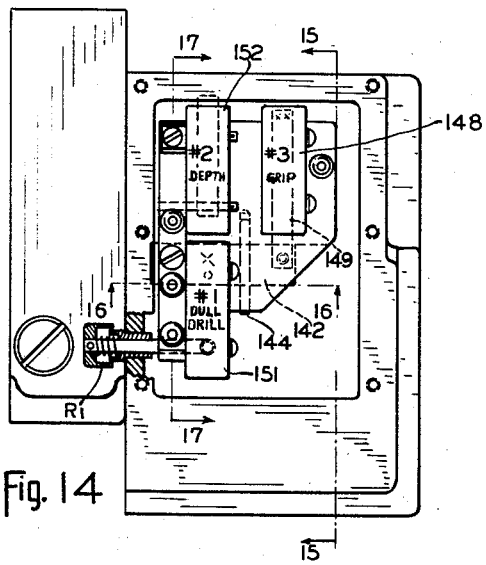
Fig. 14 is a view in front elevation of the switch-box.
Figure 15:
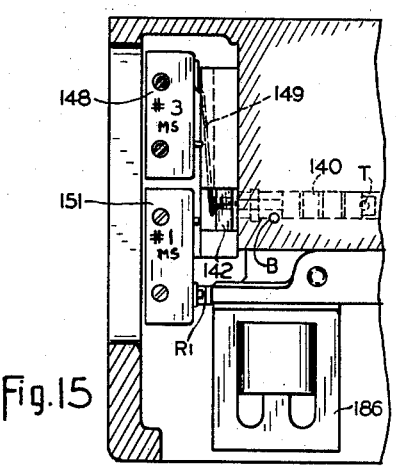
Fig. 15 is a sectional view on the line 15—15 in Fig. 14.
Figure 16:
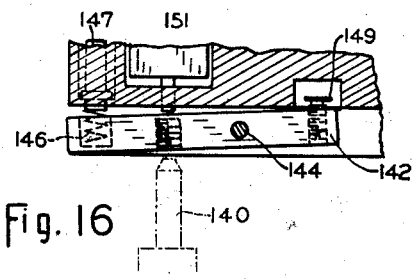
Figs. 16 and 17 are enlarged sections on the respective lines in Fig. 14.
Figure 17:
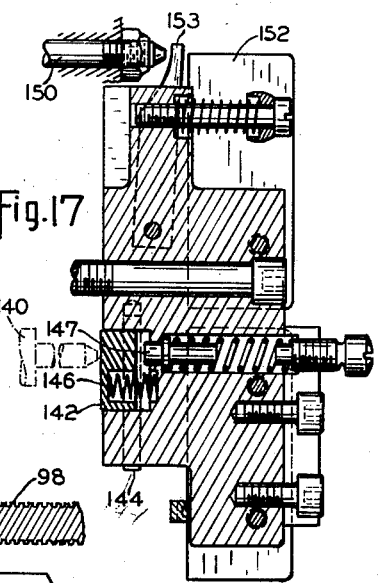

As soon as the drill is in contact with the work, pressure rises at the top or rear side of the main cylinder 54, this being labeled T, and there is a line from the top of the cylinder to a passage 138, so that a plunger 140 is moved to the left in Fig. 5 and impinges upon a hinged arm 142 moving the same to the left in Fig. 5 about its axis 144. In so doing, the arm 142 pushes against spring 146 and stop 147 at the opposite side of the arm from the plunger 140. The motion of arm 142 actuates a blade 149 which thereupon operates a micro-switch indicated at 148, and this in turn energizes the grip solenoid No. 3, which is indicated by reference numeral 100, to cause the V blocks to grip the rod 98, etc. as above described. Until the drill strikes the work and starts the slow feed, the rod 98 has been movable relative to blocks 90, 94 and the depth-control plunger 126 does not start to move until the slow work feed starts to operate. It will be seen in Fig. 14, the No. 3 grip micro-switch indicated by 148 is associated electrically with the No. 3 grip solenoid for the purpose of indicating which micro-switch is associated with corresponding other parts.

If the drill should be dull, the back pressure in the line T will increase and this will push the arm 142 even further to the left against the action of a spring pressing plunger 147 as well as spring 146, and this opens a normally closed switch 151 which in turn causes the red light to operate, indicating the fact that the tool is dull and needs to be changed. Switch 148 and a switch 152 are in series and both have to be closed in order for the clamp blocks 90 and 94 to clamp the rod 98 for travel with the drill head. The switch 151 when open closes a normally open switch CRL connected in circuit to light the red lamp R, see the circuit diagram, Fig. 4. The operator pushes button R1 (Fig. 3) to reset the switches after changing drills.

There is a depth control pin 150 which operates a micro-switch No. 2 indicated at 152 in order to operate the No. 4 solenoid which is the reversal solenoid and is indicated at 154. The plunger 126 strikes the pin member 150 at the end of the predetermined operation, and moves it an extremely small amount to cause the micro-switch to operate by means of a lever 153. This operation then initiates the reversing action but in any event it stops the forward feed of the drill instantly by providing pressure in the line 156 leading to a valve 158 having a chamber 160 in which there is a plunger 162. Special means is utilized for preventing immediate reversal, but forward motion of the drill is instantly stopped by the main valve 62, which is moved due to the pressure in line 156. The valve 158 is best seen in Fig. 10 and the line 156 is as indicated, leading into the chamber 160.

Figure 10:
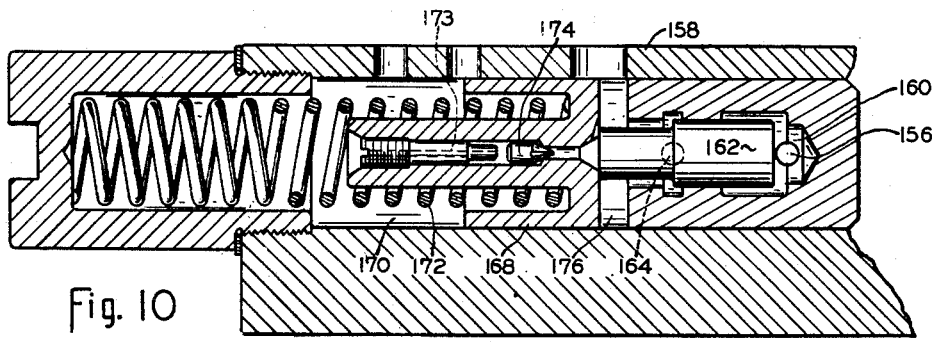
Fig. 10 is an enlarged section through the reversing valve.

The actual reversal by means of the plunger 162, member 60 and main valve 62 will not take place until the plunger 162 has moved far enough to the left, say in Fig. 10, to cause inter-communication between a pressure line 156 and line 164 which leads to the opposite end of the plungers 58 from the entrance end thereof of a pipe 166. This line leads to the starting solenoid No. 2 which is indicated by the reference numeral 167. Reversal is occasioned by moving plunger 58 and hence member 60 to the right and start of the drill head is occasioned by moving this plunger to the left.

Plunger 162 is movable only slowly to the left as it has to push a hollow piston 168 which is located in an oil filled chamber 170 and is backed up by a spring 172. The oil in the chamber leaks outwardly as through a bore 173 in the piston 168, and is enabled to leak past a taper plunger 174 which is made similarly to that shown in Fig. 13. The operation therefore is that when pressure is applied to line 156 by reason of the operation of reversal solenoid indicated at 154, plunger 162 starts to move to the left, but is held from moving rapidly by reason of the oil in the chamber 170. This oil, however, slowly leaks outwardly to the right into the chamber 176 under control of the taper plunger 174. The effect is that the forward motion of the drill ceases, but reversal does not take place until there has been a substantial period of dwell of the drill spindle in its forward positon, i. e., in the position of deepest drilling, and this is for the purpose of cutting off and clearing all chips from the hole prior to the actual retraction taking place.

When reversal occurs, No. 3 grip solenoid 100 is de-energized, and the depth control blade 68 is moved back to the left to original starting position under influence of a spring 182; the drill head, the arm 34, rod 32, and rod 98, are all brought back to their original positions once more and upon next setting of cam 66, the operation may be repeated. The operation is of course repeated in any event, whether or not there is a re-adjustment of the cam 66, and this cam is provided with pivoted brake members 184 which may be operated from the line 180 upon actuation of the depth control solenoid No. 1 which is indicated as 186. The brake members grip a disc 181 fixed to shaft 64, by reason of plungers 153 hydraulically operated by the pressure in line 180 to accurately fix the cam 66 at the instant of contact of the blade, 68 therewith.

The work being clamped, the switch CR2 is in position to be closed thereby, by direct connection of the work clamp thereto and this short-circuits the breakers labeled "cutouts" in the diagram (Fig. 4). Switch CR2 insures that the operation will not be interrupted, once having started. It is important in many applications, such as crankshaft balancing, that the drilling go forward and be finished without interruption.

The solenoids are controlled by various time-delay switches, these being commercial products and are indicated commercially as TD1, TD2 and TD3. When the device is first operated by the operator, a time-delay switch TD1A is energized and this energization lasts for three seconds. In other words, the depth solenoid No. 1 indicated at 136 is moved up, but in three seconds it moves down again, allowing the oil to leak out. However, during the three-second period, the pressure is applied to the depth control blade 68 as above described in order to set it with relation to the previously set cam 66. At the same time, also, the brake 184 is set.

Solenoid No. 2, the starter solenoid which is indicated at 167, is energized after the three-second delay and itself is de-energized after an additional delay of one second by TD1B. This starts the rapid advance by causing pressure to shift plunger 60 from one position to the other, and the faster forward traverse of the device is in operation due to actuation of the main valve 62 by the shaft plunger. Also, green light G is now on. However, as stated above, the No. 3 grip solenoid does not go into operation until the micro-switch 148 has been energized under the influence of arm 142 in turn under the influence of plunger 140, and this occurs at the instant of the start of the slow feed of the drill. However, it must be remembered that the blocks 90 and 94 have been originally set according to the position of blade 68, by depth control solenoid No. 1, and therefore at the instant of start of slow feed, depth control mechanism is in operation and continues to be in operation until the depth control pin 150 actuated by the depth control plunger 126, actuates micro-switch 152 in order to stop the feed as above described, the actual reverse taking place in a second or a second-and-a-half afterward, and it is to be noted that this dwell is occasioned hydraulically by the valve 158.

In many cases, chip breaking is required or preferred, and the feed of the drill is desired to be interrupted, so that the drill may continue to rotate but neither feed forwardly nor reverse. This is accomplished by a commercial time delay switch which is indicated at TD2. TD2 times the operation of feed and hence the length of the chip by energizing reverse solenoid No. 4 indicated at 154 but the time delay switch TD3 is timed only long enough to break the chip but not long enough to actually cause reversal. In other words, the hydraulic dwell by valve 62, explained above, is not long enough to allow plunger 162 to uncover the port for the line 164 and therefore dwells are achieved without reversal by the inter-position of the time delay switches in the proper positions in the circuit.

Having thus described my invention and the advantages thereof, I do not wish to be limited to the details herein disclosed, otherwise than as set forth in the claims, but what I claim is:

1. Apparatus of the class described comprising a cutting tool, means to move the same to make a cut to remove material from a workpiece, means to control the tool moving means including reversal means therefor and means for retraction of the tool from the cut at a predetermined point, said control means comprising a cam, means to set the cam, a movable cam feeler blade in operative relation to the cam, a clamp, an element to be clamped to and released with respect to the clamp, means associated with the tool to cause movement of the element, separable inter-engaging means between the cam feeler blade and the clamp, means to move the blade and said interengaging means, and thus the clamp, in a direction toward the cam, means to actuate the clamp to clamp and release the element, means to delay said clamp actuating means in timed sequence to and after the cam feeler blade engages the cam, the cam feeler blade moving the clamp relative to said element during the movement of the cam feeler blade to the cam, the cam thereby determining the relative position of the clamp to the element, and means on the clamp to engage and actuate the tool reversal means.

2. Apparatus of the class described comprising a cutting tool, means to move the same to make a cut to remove material from a workpiece, means to control the tool moving means including means to cause reversal of the tool and retraction of the tool from the cut at a predetermined point, said control means comprising a cam, means to set the cam, a movable cam feeler blade in operative relation to the cam, a clamp, an element to be clamped to and released with respect to the clamp, means associated with the tool to cause movement of the element, inter-engaging means between the cam feeler blade and the clamp to move the latter with the former in a direction toward the cam, means to actuate the clamp to clamp and release the element, means causing the clamp actuating means to grip the element only upon engagement of the tool with the work, so that the clamp moves in the working direction of the tool only during cutting operations, and means on the clamp to engage and actuate the tool movement reversal means at the end of the clamp motion.

3. Apparatus of the class described comprising a cutting tool, means to move the same to make a cut to remove material from a workpiece, means to control the tool moving means to cause reversal thereof and retraction of the tool from the cut at a predetermined point, said control means comprising a cam, means to set the cam, a movable cam feeler blade in operative relation to the cam, a clamp, an element to be clamped to and released with respect to the clamp, means associated with the tool to cause movement of the element, inter-engaging means between the cam feeler blade and the clamp to move the latter with the former in a direction toward the cam, means to actuate the clamp to clamp and release the element, and means to actuate the clamp to grip the element at the instant of engagement of the tool and work, said last-named means comprising a hydraulic plunger, hydraulic pressure means for the plunger, means to increase the hydraulic pressure as the tool engages the work to move the plunger, and a control member actuated by the plunger in the movement thereof, said control member being operatively associated with the means to control the tool-moving means to cause actuation thereof.

4. The apparatus of claim 3 including means to further increase the hydraulic pressure on the plunger in the event of undue cutting resistance due to a dull cutter, the increased pressure moving the plunger to a greater extent, and signal means positioned to be energized by reason of the plunger's greater extent of travel.

5. Apparatus of the class described comprising a cam, means to set the cam according to a predetermined reckoning, a tool head, a tool on the head, means to reciprocate the tool head including a hydraulic cylinder, a valve for controlling hydraulic fluid for advancing the tool head at fast traverse and slow feed and for retracting the tool head, an element advancing with the tool head, a clamp to grip the element for advance of the clamp therewith, means to operate the clamp at a point in the advance of the element determined by the cam setting, said last-named means comprising a plunger connected by a line to the top of the cylinder so that increase of back pressure causes the plunger to move, a control member engageable and operable by the plunger when moved by the back pressure, a clamp-actuating device operated according to the control member, and means on the clamp to cause reversal of the hydraulic cylinder.

6. Apparatus of the class described comprising a tool head, a variably positionable member settable according to a predetermined reckoning, a hydraulic cylinder and piston effective to reciprocate the tool head at fast advance, slow feed, and reverse, a member advancing with the tool head, means to grip the member to advance with it at a location determined by the setting of the variable member, means to actuate the member gripping means as the back pressure in the cylinder increases due to work load, a fixed position cylinder control element for initiating reverse, and means on and movable with the gripping means to contact and actuate the cylinder control element to cause reversal, whereby the length of distance of tool cut is determined by the position of the variably positioned member.

7. The apparatus of claim 6 including means for maintaining the member and member gripping means in fixed position during fast advance of the tool head, the member and gripping means advancing only during slow feed of the tool head.

8. The apparatus of claim 6 including means to cause delay of the reversal of the cylinder while stopping advance thereof.

9. The apparatus of claim 6 including means to cause delay of the reversal of the cylinder while stopping advance thereof, a tool on the tool head, and means to rotate the tool to clear chips from the cut prior to reversal and during the period of cessation of advance.

10. Apparatus of the class described comprising a tool head, a variably positionable member settable according to a predetermined reckoning, a hydraulic cylinder and piston, means effective to cause the piston to reciprocate the tool head at fast advance, slow feed, and reverse, a member advancing with the tool head, means to grip the member to advance with it at a location determined by the setting of the variable member, means to actuate the member gripping means as the back pressure in the cylinder increases due to work load, said first-named means including a fixed position cylinder control element, a stopping control element and a reversal mechanism, means on and movable with the gripping means to contact and actuate the cylinder control element to cause stopping of the head and initiation of reversal, and means delaying operation of the reversal mechanism while providing for instant stopping of feed motion of the tool head, said reversal delaying means comprising a hydraulic plunger, and metered oil leaking means resisting the motion of the plunger for a period of time only.

11. Apparatus of the class described comprising a tool head, cylinder and piston means to advance and retract the tool head including a valve controlling the cylinder and piston for stop, fast advance, slow feed, and reverse travel, means to start the tool head in advance, means to change the advance to slow feed, means to stop the slow feed at a predetermined point, and means to effect reversal after a dwell of the tool head at the extreme limit of slow feed advance, said reversal effecting means comprising a plunger to control the valve, a pressure line to move the plunger, a valve in the pressure line movable to open or close the pressure line, means to apply pressure to the second-named valve to shift the same to open the line, a metered oil passing plunger resisting the shift of the second plunger for a period of time to effect delay, and means to operate the feed stopping means, and the pressure-applying means simultaneously.

12. The apparatus of claim 11 wherein the means to operate the feed stopping means and the pressure applying means includes a valve, a plunger, and means to shift the last-named plunger according to a predetermined position of the tool head.

13. The apparatus of claim 11 wherein the means to operate the feed stopping means and the pressure applying means includes a valve, a plunger, and a solenoid to move the last-named plunger, an electric switch to energize the solenoid, and means traveling with the head to contact and throw the switch.

14. The apparatus of claim 11 wherein the means to operate the feed stopping means and the pressure applying means includes a valve, a plunger, and a solenoid to move the last-named plunger, an electric switch to energize the solenoid, and means travelling with the the head to contact and throw the switch, said switch contacting means comprising a grip device and control mechanism to cause the grip device to travel with the tool head during slow feed only.

15. Depth control for drilling machines having a tool head and means to travel the head at fast advance, slow feed, and reverse, said control comprising a settable cam, a depth control blade movable to be set in contact with the cam, means to move the blade toward the cam, an electric circuit including an electric starter switch, a time delay device operatively connected for delaying energization of the circuit for the period during which the depth control blade is moved toward the cam, a second time delay device in the circuit energized through the first time delay device to control the tool head travel means to start the same at fast advance, means to throw the tool head traveling means to slow feed upon tool contact with the work, movable means engaged and set by the depth control blade and traveling with the tool head to control the tool head travel means to stop the feed of the tool head at a predetermined point, and means in the circuit to cause the tool head travel means to reverse.

16. The depth control of claim 15 including means to delay reversal of the tool head after the cessation of feed.

17. The depth control of claim 15 including means to interrupt the feed at intervals without reversal of the tool head.

18. Depth control for drilling machines having a tool head, means to rotate a tool thereon, hydraulic means to reciprocate the tool head, a valve to control the hydraulic means for fast advance, slow feed, reverse, and stop, said depth control comprising a settable cam, means to set the cam, a depth control blade for movement to and from the cam, said cam having a cam surface in the path of the blade to variably restrict the movement of the blade toward the cam according to the setting of the cam, hydraulic means to move the blade to the cam various amounts according to the cam setting, means to retract the blade, a grip device moved according to the blade movement toward the cam, a stop pin on the grip device, a depth control rod on the head movable therewith, said rod moving in relation to the grip device to be gripped thereby so that the grip device will move with the rod, means to actuate the grip device to grip the rod at the instant of start of slow feed, the rod moving with the head free of the grip device otherwise, and means to act on contact with the stop pin to cause reversal of the tool head.

19. Depth control for drilling machines having a tool head, means to rotate a tool thereon, hydraulic means to reciprocate the tool head, a valve to control the hydraulic means for fast advance, slow feed, reverse, and stop, said depth control comprising a settable cam, means to set the cam, a depth control blade for movement to and from the cam, said cam having a cam surface in the path of the blade to variably restrict the movement of the blade toward the cam according to the setting of the cam, hydraulic means to move the blade to the cam various amounts according to the cam setting, means to retract the blade, a grip device moved according to the blade movement toward the cam, a stop pin on the grip device, a depth control rod on the head movable therewith, said rod moving in relation to the grip device to be gripped thereby so that the grip device will move with the rod, means timed to release the blade from the grip device prior to gripping of the rod by the grip device, means to actuate the grip device to grip the rod at the instant of start of slow feed, the rod moving with the head free of the grip device otherwise, and means to act on contact with the stop pin to cause reversal of the tool head, and a slow leak hydraulic valve mechanism to delay the reversal while maintaining the tool head in stop position.

20. Depth control for drilling machines having a tool head, means to rotate a tool thereon, hydraulic means to reciprocate the tool head, a valve to control the hydraulic means for fast advance, slow feed, reverse, and stop, said depth control comprising a cam, means to set the cam, a movable grip device, means to adjust the position of the grip device, means effective to actuate said last-named means to adjust the position of the grip device varying degrees according to the cam setting, a member movable with the tool head in relation to the grip device to be gripped and released thereby, means to cause the grip device to grip the member at the start of slow feed, means to start slow feed as the tool contacts the work, fixed position control means for stopping the head, means on the grip device to actuate the fixed position control device and stop the head, said fixed position control means also causing reversal of the head.

21. Depth control for drilling machines having a tool head, means to rotate a tool thereon, hydraulic means to reciprocate the tool head, a valve to control the hydraulic means for fast advance, slow feed, reverse, and stop, said depth control comprising a cam, means to set the cam, a grip device settable according to the cam setting, a member movable with the tool head in relation to the grip device to be gripped and released thereby, means to cause the grip device to grip the member at the start of slow feed, means to start slow feed as the tool contacts the work, fixed position control means for stopping the head, means on the grip device to actuate the fixed position control device and stop the head, said fixed position control means also causing reversal of the head, and means causing a delay between the instant of stopping the head and reversing the same.

22. Depth control for drilling machines having a tool head, means to rotate a tool thereon, hydraulic means to reciprocate the tool head, a valve to control the hydraulic means for fast advance, slow feed, reverse, and stop, said depth control comprising a cam, means to set the cam, a grip device settable according to the cam setting, a member movable with the tool head in relation to the grip device to be gripped and released thereby, means to cause the grip device to grip the member at the start of slow feed, means to start slow feed as the tool contacts the work, fixed position control means for stopping the head, means on the grip device to actuate the fixed position control device and stop the head, said fixed position control means also causing reversal of the head, and means causing interruption to the slow feed in the absence of reversal to cause the tool to break chips in the hole.

23. Depth control for drilling machines having a tool head, means to rotate a tool thereon, hydraulic means to reciprocate the tool head, a valve to control the hydraulic means for fast advance, slow feed, reverse, and stop, said depth control comprising a cam, means to set the cam, a grip device settable according to the cam setting, a member movable with the tool head in relation to the grip device to be gripped and released thereby, means to cause the grip device to grip the member at the start of slow feed, means to start slow feed as the tool contacts the work, fixed position control means for stopping the head, means on the grip device to acuate the fixed position control device and stop the head, said fixed position control means also causing reversal of the head, and means to release the grip device at the stop position of the feed of the tool head so that the grip device is free of the member for retraction of the head without the grip device.

24. Depth control for drilling machines having a tool head, means to rotate a tool thereon, hydraulic means to reciprocate the tool head, a valve to control the hydraulic means for fast advance, slow feed, reverse, and stop, said depth control comprising a cam, means to set the cam, a grip device settable according to the cam setting, a member movable with the tool head in relation to the grip device to be gripped and released thereby, means to cause the grip device to grip the member at the start of slow feed, means to start slow feed as the tool contacts the work, fixed position control means for stopping the head, means on the grip device to actuate the fixed position control device and stop the head, said fixed position control means also causing reversal of the head, means to release the grip device at the stop position of the feed of the tool head so that the grip device is free of the member for retraction of the head without the grip device, and means to retract the grip device and set the same under control of the ensuing setting of the cam.

References Cited in the file of this patent

UNITED STATES PATENTS

| | | |
|---|---|---|
| 1,911,138 | Clute et al. | May 23, 1933 |
| 2,084,562 | Schafer | June 22, 1937 |
| 2,114,389 | Kingsbury | Apr. 19, 1938 |
| 2,235,393 | Baker | Mar. 18, 1941 |
| 2,243,379 | Johnson | May 27, 1941 |
| 2,287,559 | Nye | June 23, 1942 |
| 2,359,470 | Eddison | Oct. 3, 1944 |
| 2,492,092 | Bulliet | Dec. 20, 1949 |
| 2,495,312 | Bickel et al. | Jan. 24, 1950 |
| 2,690,205 | Stary | Sept. 28, 1954 |